United States Patent [19]
Flynn

[11] Patent Number: 6,047,567
[45] Date of Patent: *Apr. 11, 2000

[54] SHEAR BLADE FOR GLASS GOB SHEARING APPARATUS

[75] Inventor: Robin L. Flynn, Waterville, Ohio

[73] Assignee: Owens-Brockway Glass Container Inc., Toledo, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/093,402

[22] Filed: Jun. 9, 1998

[51] Int. Cl.[7] .................................. C03B 7/10; C03B 9/46
[52] U.S. Cl. ................................ 65/334; 65/133; 65/174; 65/332; 83/620; 83/623; 83/832
[58] Field of Search .............................. 65/133, 174, 176, 65/332, 334; 83/832, 618, 620, 623; D45/5

[56] References Cited

U.S. PATENT DOCUMENTS

| | | |
|---|---|---|
| 1,626,737 | 5/1927 | La France . |
| 1,760,435 | 5/1930 | Peiler . |
| 1,879,690 | 9/1932 | Kadow et al. . |
| 1,906,650 | 5/1933 | Soubier . |
| 2,053,039 | 9/1936 | McSwain . |
| 2,401,994 | 6/1946 | Weber . |
| 3,607,208 | 9/1971 | Kapral . |
| 3,768,360 | 10/1973 | Heyne . |
| 3,800,344 | 4/1974 | Heyne . |
| 3,962,939 | 6/1976 | Stengle, Jr. ................................. 83/51 |
| 3,996,037 | 12/1976 | Wythe . |
| 4,388,100 | 6/1983 | Marroquin . |
| 4,450,741 | 5/1984 | Mumford . |
| 4,499,806 | 2/1985 | Mumford . |
| 5,711,777 | 1/1998 | Nickey et al. . |

*Primary Examiner*—Stanley S. Silverman
*Assistant Examiner*—Jacqueline A. Ruller

[57] ABSTRACT

A unitary shear blade (20) for shearing a plurality of spaced apart streams of molten glass into individual gobs, the shear blade having a free end (20a) and an opposed end (20b). The free end is provided with a plurality of side-by-side shearing surfaces (22, 24, 26) each of which has a generally V-shaped machined shearing edge. A plurality of fastener receiving openings (28) extends through the shear blade at locations adjacent the opposed ends thereof to permit the shear blade to be removably secured to a carriage (10) by a plurality of threaded fasteners (12).

2 Claims, 2 Drawing Sheets

SHEAR BLADE FOR GLASS GOB SHEARING APPARATUS

FIELD OF THE INVENTION

This invention relates to a shear blade of the type used in apparatus for shearing gobs of molten glass from each of a plurality of spaced apart, downwardly-flowing streams of molten glass.

BACKGROUND OF THE INVENTION

U.S. Pat. No. 5,711,777 (Nickey et al.), which is assigned to the assignee of this application, the disclosure of which is incorporated by reference herein, discloses shearing apparatus for shearing gobs of molten glass from each of a plurality of spaced apart, downwardly flowing streams of molten glass. The '777 patent utilizes a plurality of individual blades, one for each of the glass streams to be sheared, on each of an opposed pair of carriages, and drive means for moving the carriages periodically toward one another to bring the opposed pair of shear blades into partly overlapping, shearing relationship with one another, and then away from one another to permit a portion of the molten glass stream to be sheared by such opposed pair of blades to pass therebetween until sufficient molten glass has passed therebetween to form another gob. The '777 patent specificatively discloses three (3) such shear blades on each of the opposed pair of carriages, along parallel or substantially parallel paths which is the arrangement to be used in simultaneously shearing glass gobs from each of three (3) spaced apart, downwardly flowing streams of molten glass, a process that is used in producing glass containers by the triple gob version of a glass container forming machine of the individual section (I.S.) type. Of course, only two (2) such shear blades would be used in producing glass containers by a double gob version of an I.S. machine, and four (4) such blades would be required in producing glass containers by a quadruple gob ("quad") version of such a machine. Other prior art versions of an opposed carriage, multiple glass gob shearing apparatus are disclosed in U.S. Pat. Nos. 4,450,741 (Mumford) and 4,499,806 (Mumford), the disclosure of each of which is also incorporated by reference herein.

The shearing devices described in each of the aforesaid '777, '741 and '806 patents utilize individual shear blades on each of the opposed, reversible motion carriages, one (1) such shear blade each of the carriages for each of the glass streams to be severed. Thus, each such blade must be individually installed on its carriage, and individually removed from such carriage when it is time for resharpening or replacement, which occurs quite frequently in a high production glass container manufacturing operation, and these are time consuming procedures and necessitate a suspension of container production during the installation and removal steps. Also, in such an arrangement individual shear blades are subject to warpage during service due to a high temperature environment in which they are used, and this warpage can vary from blade to blade of the blades on each carriage, which can lead to shear marks on the sheared gobs and on the containers formed therefrom, and/or to premature blade wear due to the abrasive character of molten glass.

SUMMARY OF THE INVENTION

According to the present invention there is provided a single piece shear blade for a carriage of an opposed carriage glass gob shearing device of the type used in shearing glass gobs from each of a plurality of spaced apart, downwardly-flowing streams of molten glass. The use of a single piece shear blade in such a device, as opposed to multiple shear blades as taught by the prior art, simplifies the installation and removal of the blade, and reduces the time required for each of these steps, because fewer fasteners are needed to install a single piece shear blade, as opposed to the total number of fasteners needed to install a plurality of shear blades. Further, the manufacturing cost for a single piece shear blade is reduced relative to the manufacturing cost of a plurality of individual shear blades, because reduced and simplified handling and fixturing is required during the laser cutting, machining and grinding operations involved in manufacturing shear blades. The cost of resharpening a single piece shear blade, as opposed to the cost of resharpening a plurality of shear blades, is also reduced because of the reduced and simplified procedures and equipment involved in such an operation. The use of a single piece shear blade also reduces warpage of the tips of the shear blades, as encountered in multiple gob shearing devices utilizing individual blades, because each blade is supported at a location near its shearing end by an adjacent shear blade, and this helps to maintain the desired positions of the shearing ends of the blades until it is time to remove the shear blades for replacement or resharpening.

Accordingly, it is an object of the present invention to provide an improved device for shearing glass gobs for each of a plurality of spaced apart, downwardly flowing streams of molten glass. More particularly, it an object of the present invention to reduce the number of individual shear blades employed in an device of a foregoing character, to thereby simplify, and reduce the time required for, the procedures involved in installing the shear blades in such a device and in removing the shear blades from such a device.

It is also an object of the present invention to provide an improved shear blade for use in a device for shearing glass gobs from each of a plurality of spaced apart downwardly flowing streams of molten glass. More particularly, it is an object of the present invention to provide a shear blade of the foregoing character with a plurality of self-supporting shearing ends to retard relative warpage between the shearing ends of the shear blade.

For a further understanding of the present invention and the objects thereof, attention is directed to the drawing and the following brief description thereof, to the detailed description of the preferred embodiment of the invention, and to the appended claims.

IN THE DRAWING

Figure 2:
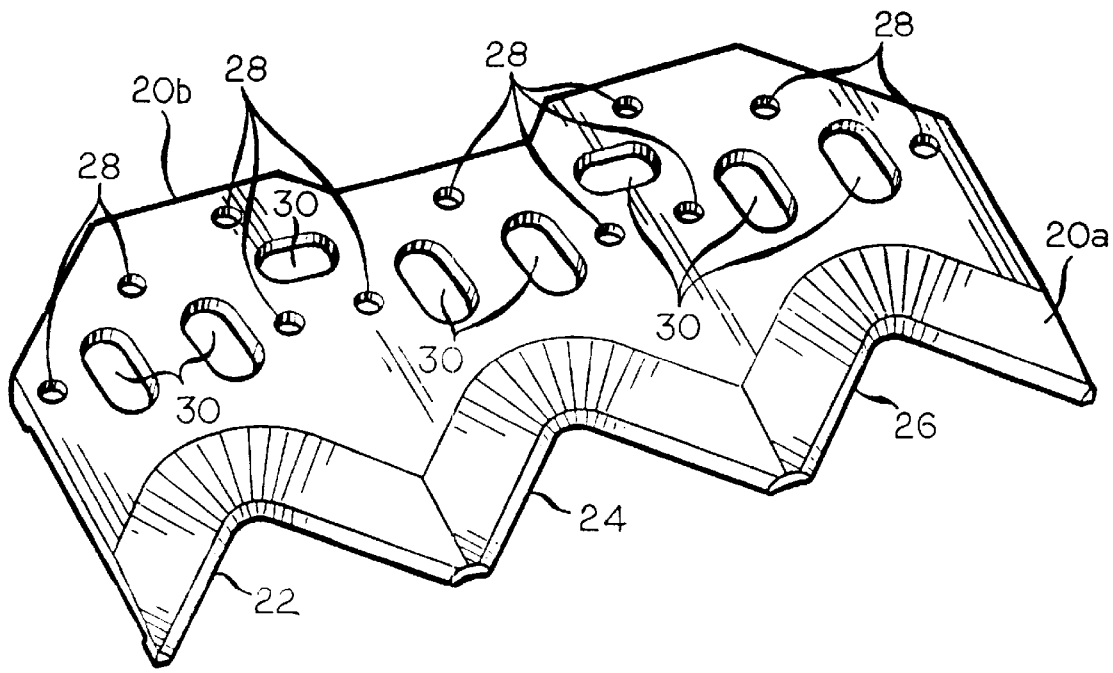
FIG. 2 is a perspective view of the shear blade of FIG. 1.
Figure 1:
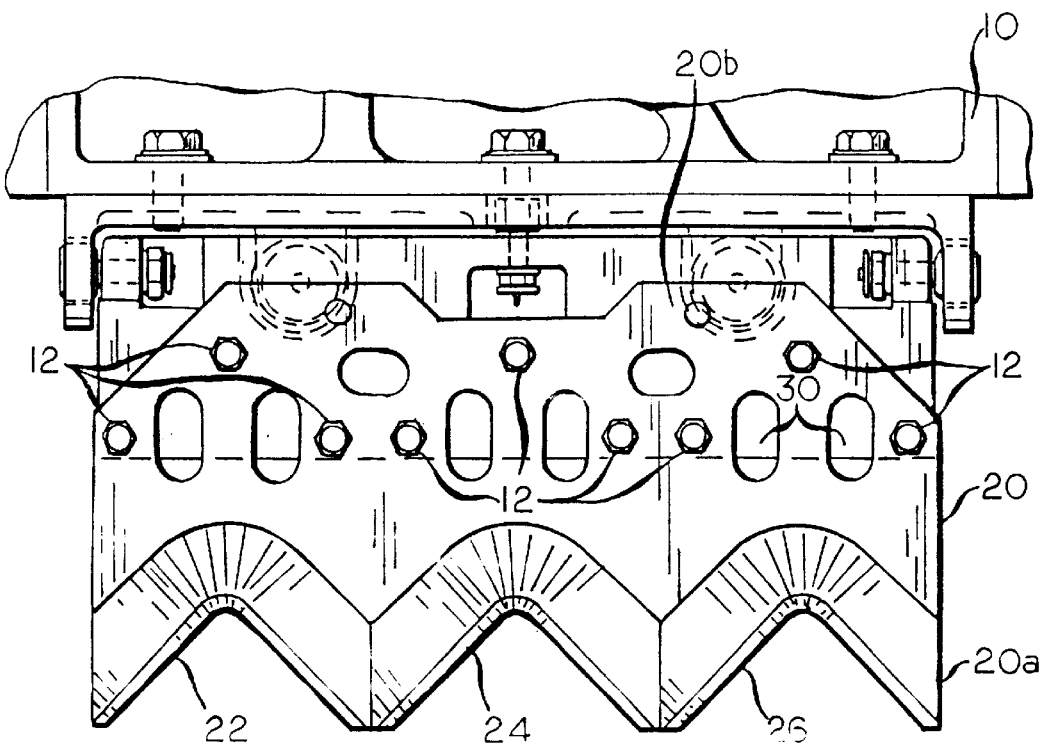
FIG. 1 is a fragmentary plan view of a shear blade carriage with a shear blade according to a preferred embodiment of the present invention.
Figure 3:
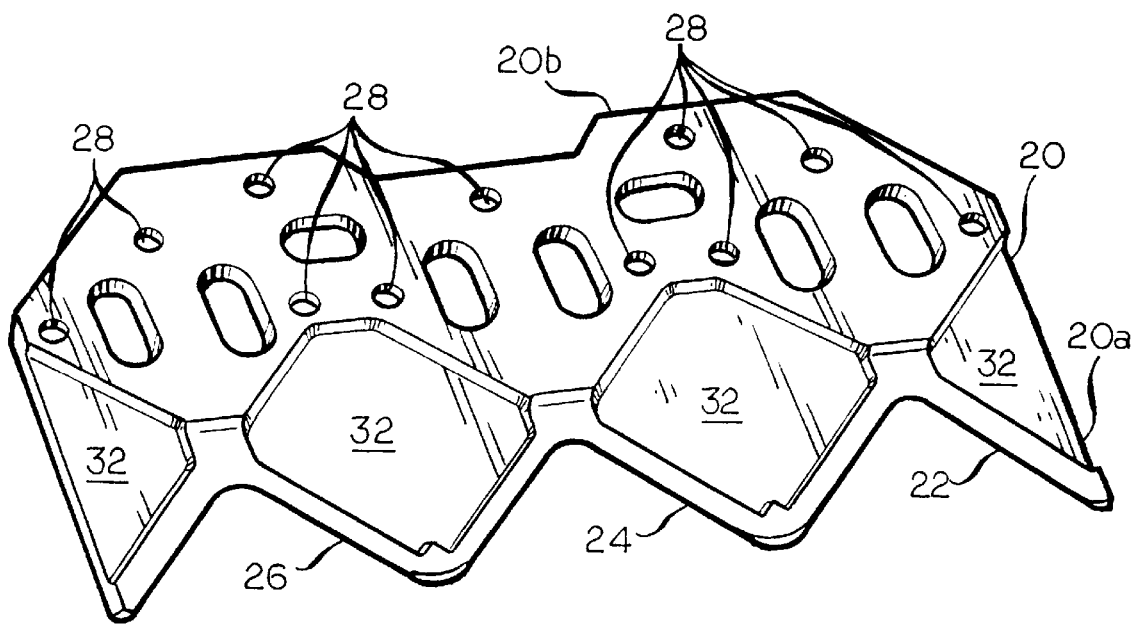

FIG. 3. is a perspective view showing the underside of the shear blade of FIGS. 1 and 2.

DETAILED DESCRIPTION OF THE PREFERRED EMBODIMENT

A shear blade carriage of the type used in a parallel shear device for use in connection with a triple gob glass container forming machine is fragmentarily shown in FIG. 1 where it is identified by reference numeral 10. A double-ended, one-piece shear blade 20, with three (3) side-by side shearing surfaces 22, 24, 26 at a free end 20a of the shear blade 20, is removably attached to the carriage 10 by a plurality of threaded fasteners 12, each of which passes through an opening 28 in the shear blade 20, near an opposed end 20b thereof. While the blade 20 is shown as having three (3) shearing surfaces, only two (2) such shearing surfaces would be provided in a blade intended for use in a double gob glass container forming operation. In connection with a quadruple gob glass container forming operation, either a single blade with four (4) side-by-side shearing surfaces or an adjacent pair of blades each with two (2) side-by-side shearing surfaces could be used to advantage over a shearing device with four (4) individual shearing devices.

The blade 20 is manufactured from a plate of a durable grade of tool steel, and its shearing surfaces 22, 24, 26 are sharpened by grinding, after cutting into a generally V shaped edge by a machining operation. The openings 28 are formed in the blade 20 by machining, as are the openings 30 which are provided to reduce the weight of the blade 20. To further reduce the weight of the blade 20, and to provide clearance for tips of an opposed shear blade when the opposed shear blades are mounted slightly out of parallel, partial depth recesses 32 are formed in the underside of the blade 20 as shown in FIG. 3, which is the side facing the opposed shear blade (not shown) of a parallel shear device in which the blade 20 is used.

Because the shearing surfaces 22, 24, 26 of the blade 20 are part of the same blade, as opposed to being parts of separate blades in accordance with the teachings of the prior art, they tend to remain co-planar and parallel to one another in service by virtue of the support that each derives from the others. Thus, the single-piece shear blade 20 tends to reduce warpage of the shearing surfaces of individual shear blades according to prior art teachings, and such warpage can occur in the high temperature environment of a glass gob shearing device and can lead to premature shear blade wear due to the abrasive character of molten glass and/or to shear marks on the glass gobs produced thereby and on the containers produced therefrom.

The shear blade 20 is not shown as being internally cooled in accordance with the teachings of the aforesaid '777 patent. However, it's to be understood that the present invention can be practiced with an internally cooled shear blade according to such teachings, if desired.

Although the best mode contemplated by the inventor for carrying out the present invention as of the filing date hereof has been shown and described herein, it will be apparent to those skilled in the art that suitable modifications, variations and equivalents can be made without departing from the scope of the invention, such scope being limited solely by the terms of the following claims and the legal equivalents thereof.

What is claimed:

1. A multiple gob glass shearing device comprising:

a carriage;

a first double-ended shear blade, said first shear blade having a free end and an opposed end, said free end having a plurality of side-by-side shearing surfaces, said first shear blade further having a spaced apart plurality of fastener receiving openings extending therethrough at locations adjacent said opposed end, said first shear blade having an upper side and an under side and a plurality of partial depth recesses in said under side of said shear blade;

a second double-ended shear blade, said second shear blade being opposed to said first shear blade and being mounted slightly out of parallel with said first shear blade and having a free end and an opposed end, said free end of said second shear blade having a plurality of side by side shearing surfaces, said side by side shearing surfaces of said second blade being received in said partial depth recesses of said first shear blade when said first shear blade and said second shear blade are in partly overlapping, glass shearing relationship with one another; and a plurality of fasteners, each fastener extending through one of said plurality of fastener receiving openings, said fasteners serving to removably secure said first double-ended shear blade to said carriage.

2. A multiple gob glass shearing device according to claim 1 wherein each of said side-by-side shearing surfaces of said first and second double-ended shear blade has a generally V-shaped, machined shearing edge.

* * * * *